United States Patent
Love et al.

[11] 3,774,173
[45] Nov. 20, 1973

[54] PHOTOCHROMIC FIBER OPTIC PLATE

[75] Inventors: Roy E. Love; Ralph A. Westwig, both of Corning, N.Y.

[73] Assignee: Corning Glass Works, Corning, N.Y.

[22] Filed: Sept. 20, 1972

[21] Appl. No.: 290,727

Related U.S. Application Data

[62] Division of Ser. No. 180,364, Sept. 14, 1971, Pat. No. 3,715,150.

[52] U.S. Cl. ... 340/173 CR, 340/173 LM, 250/219, 315/8.5
[51] Int. Cl. ............ G11c 11/30, G11c 13/04
[58] Field of Search .................. 173 CR; 173 LM

[56] References Cited
UNITED STATES PATENTS
3,385,927  5/1968  Hamann ............... 340/173 CR

*Primary Examiner*—Terrell W. Fears
*Attorney*—Clarence R. Patty, Jr. et al.

[57] ABSTRACT

Disclosed is an optical image storage system of the type utilizing a photochromic fiber optic image storage plate and an apparatus for rapidly bleaching information stored in the storage plate. In addition to the usual multiplicity of optical fibers containing photochromic material, the image storage plate also comprises a plurality of conductive fibers disposed parallel to the optical fibers. Means such as an induction coil disposed around the image storage plate or transparent electroconductive electrodes disposed on opposite faces of the image storage plate are provided for causing current flow in the conductive fibers to generate heat therein, thereby bleaching or erasing information contained in the image storage plate.

10 Claims, 8 Drawing Figures

PHOTOCHROMIC FIBER OPTIC PLATE

CROSS REFERENCE TO RELATED APPLICATION

This is a division of application Ser. No. 180,364, filed Sept. 14, 1971, now U.S. Pat. No. 3,715,150.

BACKGROUND OF THE INVENTION

This invention relates to an optical information storage system, and in particular to means for erasing information stored in such a system.

Optical image storage and display devices are known which utilize normally transparent, photochromic glass plates or plastic films, portions of which are rendered opaque when subjected to ultraviolet light. In such prior art devices the photochromic material is often disposed adjacent to the faceplate of a cathode ray tube (CRT) having a phosphor which generates ultraviolet light, a dichroic filter being disposed between the faceplate and photochromic material for reflecting visible light and transmitting ultraviolet light. Light directed toward the photochromic material is either absorbed thereby or it is reflected by the dichroic filter, passes back through the transparent areas of the photochromic material and is displayed on a screen. Since the useful lifetime of organic photochromic films is quite limited, it is preferable to utilize for the storage medium a plate of a photochromic material such as photochromic glass which may be subjected to actinic radiation indefinitely without fatigue. Moreover, since photochromic glass, unlike organic photochromic materials, does not outgas when it is disposed within a CRT, it can be employed as the target substrate onto which the CRT phosphor is applied, thus permitting maximum transfer of radiated energy from the phosphor to the photochromic glass plate. However, photochromic glass does not have a sufficiently high density of darkening centers and therefore must be used in relatively large thicknesses in order to provide sufficient optical density to create a displayed image having adequate contrast. A necessary requirement of information storage systems of the aforementioned type is the almost complete erasure of darkened characters or images from the photochromic plate in less than one second. There are presently two methods of erasing or bleaching information from photochromic materials. Optical bleaching is disclosed in the publication entitled "A New Time-Sharing Terminal" by G. K. Megla and D. R. Steinberg, *Information Display*, Vol. 7, Part I — September/October 1970, pp. 15–19 and 32 and Part II — November/December 1970, pp. 31–33 and 54. In accordance with this method a beam of red light is directed upon an end face of the photochromic plate. It has been shown that this method of bleaching is inefficient. Thermal bleaching is disclosed in U.S. Pat. No. 3,428,396 issued Feb. 18, 1969 to G. K. Megla et al. This patent teaches that heat may be applied to a photochromic glass plate by an infrared heat source or a resistive coating on a surface of the photochromic plate to bleach information therefrom. The principal drawback in these methods of thermal bleaching of a photochromic glass plate having a thickness sufficient to provide adequate optical density is the slow rate of heat transfer through the plate.

SUMMARY OF THE INVENTION

It is therefore an object of the present invention to provide an optical information storage system having means for rapidly erasing information stored therein.

Briefly the optical image storage system of the present invention comprises a cathode ray tube having an image storage plate disposed therein. The plate has a multiplicity of optical fibers formed of photochromic material, the fibers being secured together in side-by-side relation so that opposite ends thereof cooperate to define first and second end faces. A plurality of conductive fibers is disposed parallel to the optical fibers in the image storage plate. Phosphor means in the cathode ray tube generate light, the wavelength of which is such that it causes those photochromic optical fibers on which it impinges to darken. Means are provided for causing current flow in the conductive fibers to generate heat therein, thereby bleaching any of the adjacent photochromic fibers which have been darkened.

DETAILED DESCRIPTION

This invention pertains to an apparatus for heating an image storage plate comprising optical fibers incorporating photochromic glass, thereby erasing information stored therein. U.S. Pat. No. 3,208,860 constitutes a basic disclosure relative to photochromic glasses. That patent describes, in particular, inorganic silicate glasses containing submicroscopic crystals of the silver halides, viz., silver chloride, silver bromide, and silver iodide, which become darker in color when the glass is subjected to actinic radiation but which regain their original color when the actinic radiation is removed and/or the glass is exposed to heat or to radiations of different wavelengths. Photochromic glass usually becomes darkened or activated by exposure to ultraviolet radiation, and the darkened areas can be bleached or erased by heat or by red or infrared radiation. The information contained in the glass persists therein for reasonable times while the glass is being read by passing therethrough radiation of a neutral wavelength which is usually green light.

A photochromic fiber optic plate is described in copending patent application Ser. No. 801,562 filed Feb. 24, 1969 in the name of R. J. Araujo, commonly assigned herewith. That application teaches a family of photochromic glasses exhibiting a refractive index sufficiently greater than 1.52 to be effective as a core element in an optical fiber. In addition to possessing a relatively low refractive index, a cladding glass should be compatible with the core glass. Generally, the thermal coefficient of expansion of the cladding glass is important since a bad mismatch of the expansion coefficients of the core and cladding often leads to poor bonding and crazing of the cladding during fiber manufacture. When the core glass is a photochromic glass, a cladding glass must be selected which will not poison or deleteriously effect the photochromic properties of the core glass. Moreover, it is sometimes desirable to utilize an absorbing cladding glass which absorbs ultraviolet light since this type of radiation is utilized to activate or darken the photochromic glass cores of conventional photochromic fiber optic plates. Alternatively, it may be desirable to utilize a non-absorbing cladding glass which is highly transmissive to ultraviolet light and to use an extra mural absorbing cladding glass which absorbs ultraviolet light. This latter type of fiber permits a high resolution image to be written into the photochromic fiber optic plate. Families of glasses suitable for use as ultraviolet absorbing cladding and non-absorbing cladding are described in copending application Ser. No. 115,370 filed Feb. 16, 1971 in the names of R. J. Araujo and L. A. Sawchuk, commonly assigned herewith.

Figure 1:
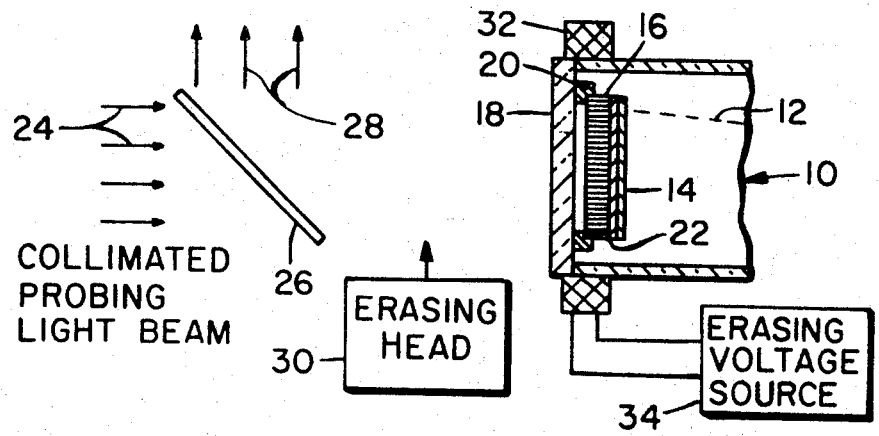
FIG. 1 is a diagrammatic view of an image storage system embodying an image erasing apparatus constructed in accordance with the present invention.

FIG. 1 illustrates an image storage and display system suitable for incorporating the improved erasing apparatus of the present invention and is similar to the system described in the aforementioned Megla et al. publication. Cathode ray tube 10 has an electron beam 12 which, by conventional techniques, scans a phosphor layer 14 while its amplitude is modulated in accordance with information to be displayed. A photochromic fiber optic plate 16 is disposed a small distance from face plate 18 by supports 20. Plate 16 comprises a plurality of photochromic glass containing fibers, each of which incorporates a metallic heating device to be hereinafter described. Disposed between phosphor layer 14 and plate 16 is a coating 22 of dichroic filter material which may be formed on plate 16 by an evaporating technique. Dichroic coating 22 is typically a multilayered film which is so constructed that it passes ultraviolet light and reflects visible light.

Ultraviolet light, which is generated by electron beam 12 penetrating phosphor layer 14, passes through dichroic coating 22 and darkens selected ones of the photochromic cores, thereby storing an image in plate 16 which is determined by those of the photochromic cores which have been darkened. Information is read out of the plate 16 by projecting a collimated beam of green probing light represented by arrows 24 through beam splitter 26 and face plate 18 and into the fibers of plate 16. The probing light is reflected from dichroic layer 22 and passes back through the fibers of the plate 16, portions of the probing light beam being attenuated by passing twice through those fibers which have been darkened by ultraviolet light generated by phosphor layer 14. The image containing light beam represented by arrows 28 is reflected by beam splitter 26 to an optical system (not shown) whereby an image may be directly viewed or projected.

Heretofore, information has been erased from a photochromic fiber optic plate by directing a beam of red or infrared radiation on one face thereof. For example, an erasing head 30, which may consist of an optical cavity containing quartz iodide lamps and a red filter, is temporarily disposed in front of the face plate 18. The light emitted by the erasing head bleaches or erases the information stored in the photochromic fiber optic plate. The use of erasing head 30 plate itself to bleach information from plate 16 is an inefficient process. In accordance with the present invention conductive fibers placed adjacent to each photochromic fiber in plate 16 are heated by RF heating or joule heating to thermally bleach information from the photochromic glass. In FIG. 1 an induction coil 32 surrounding cathode ray tube 10 in the vicinity of plate 16 provides the microwave energy necessary to heat the conductive fibers disposed within plate 16. A combination of thermal bleaching resulting from current flow in conductive fibers in the photochromic fiber optic plate and optical bleaching from a source such a erasing head 30 will result in the fastest possible erasure of information stored in plate 16.

Figure 2:
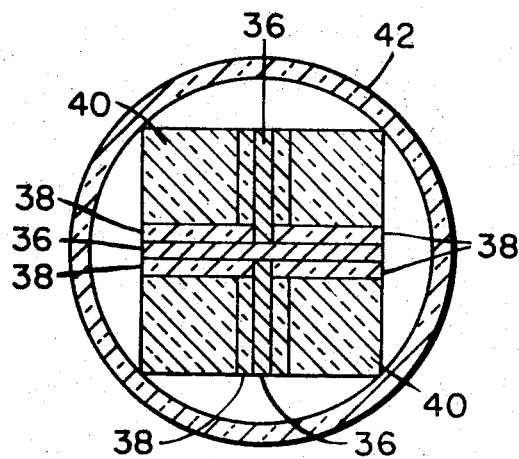
FIG. 2 is a cross-sectional view of a structure utilized in the formation of photochromic optical fibers.
Figure 3:
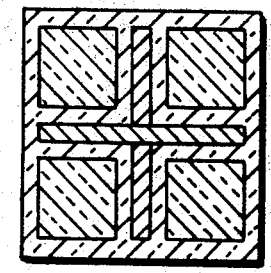
FIG. 3 is a cross-sectional view of a fiber resulting from drawing the structure of FIG. 2.
Figure 4:
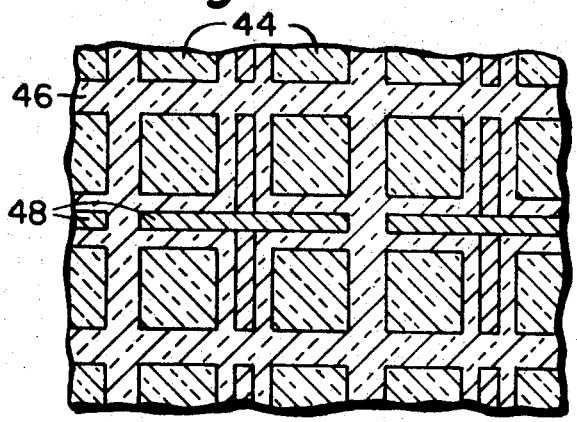
FIg. 4 is a partial cross-sectional view of a photochromic fiber optic plate formed in accordance with the present invention.

FIGS. 2, 3 and 4 illustrate steps in the manufacture of a photochromic fiber optic plate containing conductive fibers. Strips 36 of a metal such as gold, silver, lead, lead alloys or the like are disposed between sheets 38 of cladding glass which may consist of the type described in the aforementioned Araujo et al. application Ser. No. 115,370 filed Feb. 16, 1971. Bars 40 of photochromic glass are disposed adjacent to cladding sheets 38 to form an elongated composite bar 40 which is disposed within tube 42 of cladding glass. This initially formed structure is fused together and drawn down to fiber size, as is well known in the prior art. It is also well known that a plurality of such drawn down fibers, one of which is illustrated in cross section FIG. 3, can be assembled in like side-by-side manner and fused to form a fiber optic plate such as that illustrated in FIG. 4. In a finished fiber optic plate each photochromic glass core 44, which is usually less than 30 microns thick, is completely surrounded by cladding glass 46. The thin metallic fibers 48 preferably contact only the cladding glass since metals generally oxidize rapidly when in contact with photochromic glass at high temperatures. It is not necessary that fibers 48 be continuous if the fiber optic plate is to be erased or bleached by RF heating. However, if the plate is to be bleached by joule heating, as hereinafter described, continuity of the conductive fibers is necessary.

Figures 5, 6:
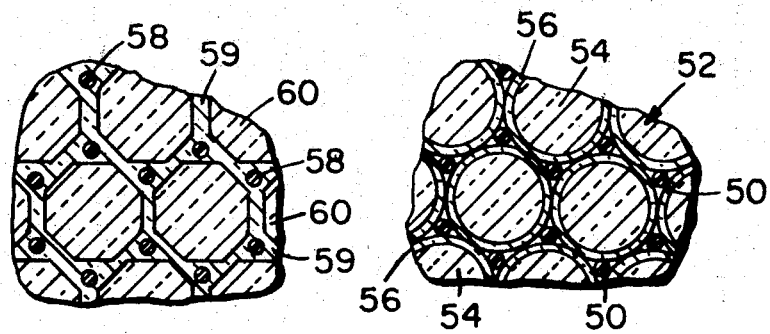
FIG. 5 is a cross-sectional view of a modified construction of a photochromic fiber optic plate.
FIG. 6 is a partial cross-sectional view of an arrangement of elements used to form the fiber optic plate of FIG. 5.

Geometries other than the pattern of square fibers illustrated in FIG. 4 can be used to provide fiber optic devices incorporating thin heating fibers. For example, the array of fibers illustrated in FIG. 5 can be made by disposing circular metallic rods 50 in the interstices formed by arranging a plurality of photochromic fibers 52 in side-by-side relation as shown in FIG. 6. Each of the photochromic fibers consists of a core 54 of photochromic glass having a given index of refraction surrounded by a layer 56 of cladding material having a lower index of refraction. A plurality of such fibers can be compressed and then drawn, cut, restacked and drawn a sufficient number of times to form the plate, a portion of which is shown in cross-section in FIG. 5. In this figure, conductive fibers 58 are completely surrounded by cladding glass 59 which is formed upon the surface of photochromic glass cores 60.

Figure 7:
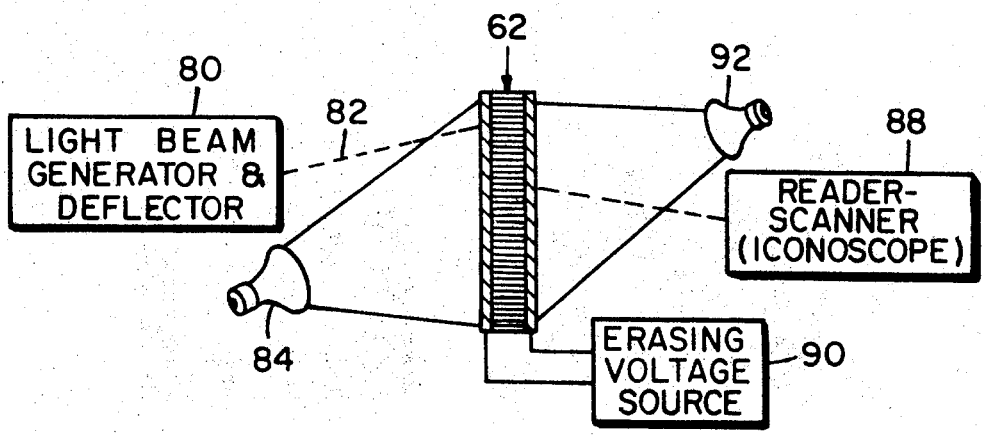
FIG. 7 is a diagrammatic view of another embodiment of an image storage system.
Figure 8:
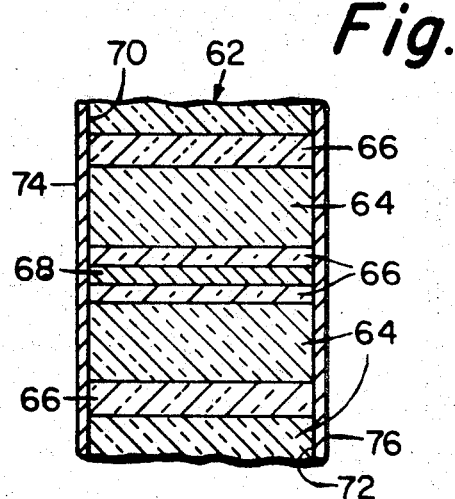
FIG. 8 is a partial cross-sectional view of the fiber optic plate of FIG. 7.

FIG. 7 illustrates another embodiment of the present invention wherein information is erased from a photochromic fiber optic plate by joule heating. Fiber optic plate 62 of this embodiment, an enlarged, cross-sectional view of which is illustrated in FIG. 8, embodies the construction previously described in conjunction with FIG. 4. Cores 64 of photochromic glass are surrounded by layers 66 of non-photochromic cladding glass. Conductive fibers 68 extend the length of the optical fibers and are completely encased in cladding glass. The fibers are arranged in side-by-side relationship so that opposite ends thereof cooperate to define faces 70 and 72. Disposed adjacent to faces 70 and 72 are transparent electroconductive films 74 and 76 which may consist of an extremely thin layer of metal, tin oxide, or the like.

Referring again to FIG. 7, light beam generator and deflector 80 may be any well known apparatus for generating and deflecting a beam 82 of blue or ultraviolet light to activate or darken selected ones of the photochromic cores 64 of plate 62. Devices for generating and deflecting light beams are disclosed in U.S. Pat. Nos. 3,436,546 issued to G. Derderian et al., No. 3,508,808 issued to U. J. Schmidt, No. 3,515,455 issued to R. Kompfner, No. 3,515,887 issued to R. Rosenburg et al., and 3,520,590 issued to H. J. Caulfield. Information may be read from plate 62 by illuminating one side thereof with green or other neutral light having negligible effect on the optical density of the photochromic cores and detecting the pattern occurring at the opposite side of the plate by appropriate detector means such as viewing the image appearing on plate 62, projecting the image, or utilizing a reader-scanner 84.

To erase information stored in plate 62 a voltage is applied to electroconductive films 74 and 76 from source 90. This causes a current to flow through conductive fibers 68, thereby heating the same and bleaching photochromic cores 64. Since this method of heat generation relies on current flow between films 74 and 76, the continuity of fibers 68 is an important factor. By directing red or infrared light from a source 92 toward plate 62 in addition to applying a voltage to films 74 and 76, thermal and optical bleaching effects simultaneously erase information from plate 62.

We claim:

1. An image storage system comprising
a cathode ray tube,
an image storage plate disposed in said cathode ray tube, said plate having a multiplicity of optical fibers formed of photochromic material, said optical fibers being secured together in side-by-side relation so that opposite ends thereof cooperate to define first and second end faces, and a plurality of conductive fibers disposed parallel to said optical fibers in said image storage plate,
phosphor means in said cathode ray tube for generating light, the wavelength of which is such that it causes those photochromic optical fibers on which it impinges to darken, and
means for causing current flow in said conductive fibers to generate heat therein, thereby bleaching any of said fibers which have been darkened.

2. An optical image storage system in accordance with claim 1 wherein said means for causing current flow comprises means for generating electromagnetic energy to induce current flow in said conductive fibers.

3. An optical image storage system in accordance with claim 2 further comprising a dichroic filter disposed on said second face of said image storage plate, said dichroic filter being substantially transparent to ultraviolet light and substantially reflective to visible light, said phosphor means comprising an ultraviolet-emitting phosphor layer disposed upon the surface of said dichroic filter, said image storage plate being disposed in said cathode ray tube so that the electron beam thereof impinges upon said phosphor layer.

4. An optical image storage system in accordance with claim 3 wherein said means for generating comprises an induction coil disposed around said cathode ray tube in the vicinity of said image storage plate, and means for energizing said induction coil.

5. An optical image storage system in accordance with claim 4 further comprising means for projecting red light onto said first face of said image storage plate.

6. An optical image storage system in accordance with claim 5 wherein each of said optical fibers comprises a photochromic glass core and a layer of non-photochromic cladding glass disposed upon the surface of said core, said conductive fibers being completely surrounded by said non-photochromic cladding glass.

7. An optical image storage system in accordance with claim 6 wherein at least a portion of a conductive fiber is disposed adjacent to each optical fiber.

8. An optical image storage system in accordance with claim 7 wherein each of said conductive fibers is completely surrounded by cladding glass.

9. An optical image storage system in accordance with claim 1 wherein said means for causing current flow comprises an induction coil disposed around said cathode ray tube in the vicinity of said image storage plate, and means for energizing said induction coil.

10. An optical image storage system comprising
a cathode ray tube,
an image storage plate having
a multiplicity of optical fibers formed of photochromic material, said optical fibers being secured together in side-by-side relation so that opposite ends thereof cooperate to define first and second end faces,
a plurality of conductive figers disposed parallel to said optical fibers in said image storage plate,
a dichroic filter disposed on said second face, said dichroic filter being substantially transparent to ultraviolet light and substantially reflective to visible light, and
an ultraviolet-emitting phosphor layer disposed upon the surface of said dichroic filter, said image storage plate being disposed in said cathode ray tube so that the electron beam thereof impinges upon said phosphor layer,
an induction coil disposed around said cathode ray tube in the vicinity of said image storage plate, and
means for energizing said induction coil to thereby generate electromagnetic energy which induces current flow in said conductive fibers, causing heat generation therein, thereby bleaching any of said optical fibers which have been darkened.

* * * * *